Feb. 21, 1967  A. L. J. CROHEM  3,305,229
VEHICLE SUSPENSION SYSTEM
Filed March 17, 1965  2 Sheets-Sheet 1

United States Patent Office 3,305,229
Patented Feb. 21, 1967

3,305,229
VEHICLE SUSPENSION SYSTEM
Albert L. J. Crohem, 80 Rue Jules Duez,
Bauvin, Nord, France
Filed Mar. 17, 1965, Ser. No. 440,524
9 Claims. (Cl. 267—11)

The present invention relates to suspension systems and particularly to the suspensions for automotive vehicles.

It is an object of the invention to provide an improved suspension system for vehicles which levels out the unevenness of the road surface and keeps the vehicle in a stable position.

The objects and advantages of the invention will be more fully understood from the following description of a preferred embodiment of the invention illustrated in the accompanying drawings in which.

Figure 1:
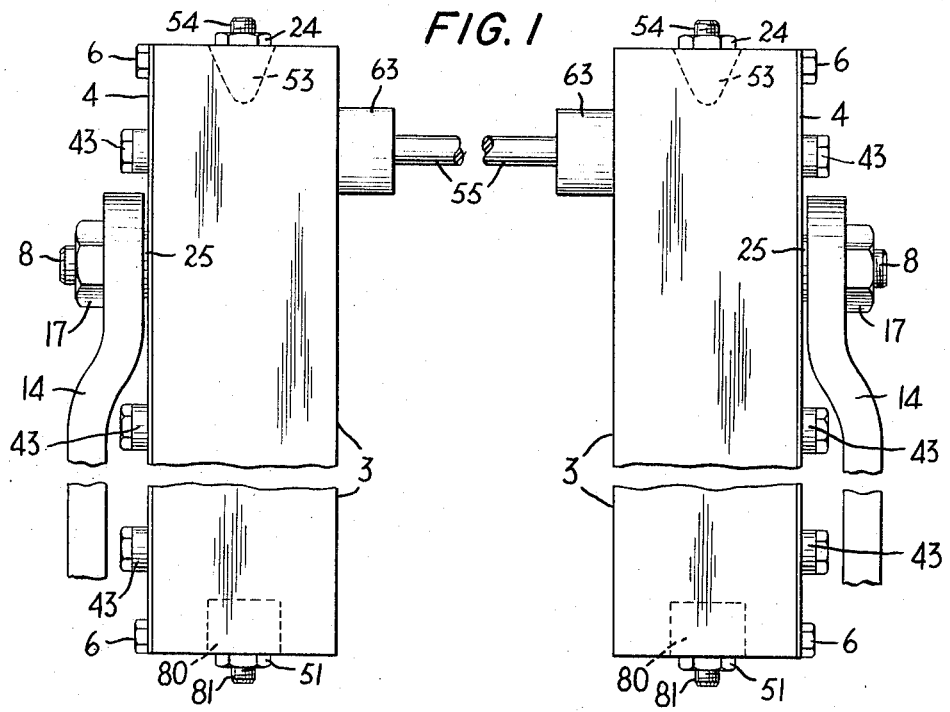
FIGURE 1 is a plan view of two similar suspension units in accordance with the invention and comprising a suspension system for opposite wheels of a vehicle.

The automobile suspension shown by way of example in the drawings, comprises a gear case 1 which is preferably made of steel and is in the form of a narrow rectangular parallel-piped which is laid on its side and reinforced at its periphery and on the lower portion of its two large sides 3 and 4 as indicated at 2. The side 4 is removable for ⅘ of its height and provides a removable cover which can close the corresponding opening of the gear case and which, with a fulcrum on the bottom portion 5, can be held in place by bolts 6 (FIG. 1) screwed into the vertical sides of the case which are provided with internal square nuts 7.

Figure 2:
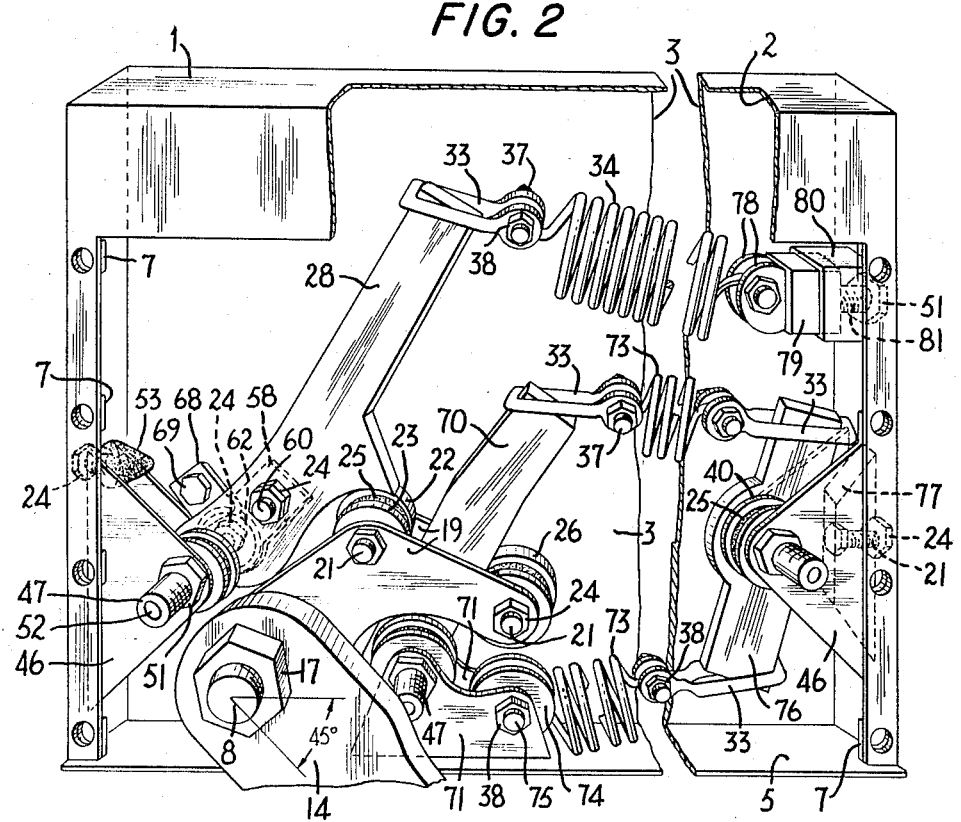
FIGURE 2 is a side view of an assembled suspension unit in accordance with the invention, one side of the casing being removed and portions being broken away to show more clearly the internal mechanism.
Figure 4:
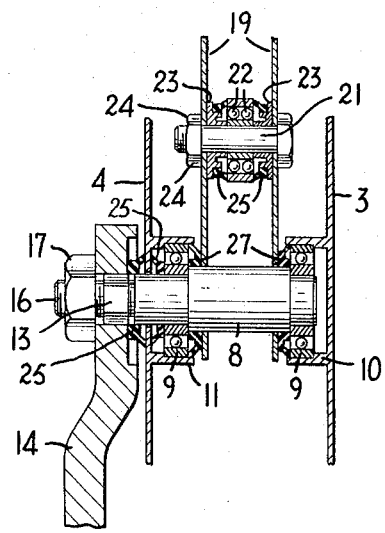
FIGURE 4 is a partial cross-sectional view of the suspension unit shown in FIGURE 2.

A steel shaft 8 is rotatably supported in two ball bearings 9 positioned in two cylindrical bearing sleeves 10 and 11 which are mounted in the gear case near its bottom and near its vertical left side as viewed in FIG. 2, the bearing sleeve 10 being mounted on lateral side 3 and the bearing sleeve 11 being mounted on removable side 4. The shaft 8 extends out of the gear case through an opening 12 provided in the side 4 and the projecting portion of the shaft is provided with a hexagonal portion 13 (FIGURE 4) on which a flat steel suspension arm 14 is mounted. The suspension arm 14 is offset as seen in FIG. 1 and is provided at its end with a hexagonal hole 15 fitting on the hexagonal portion 13 of the shaft 8 so as to provide a non-rotative connection between the arm 14 and shaft 8. The outer extremity of the shaft 8 is provided with a threaded portion 16 to receive a nut 17 which holds the arm 14 on the shaft 8 as shown in FIGS. 2 and 4. The arm 14 is offset laterally as seen in FIGURE 1 so as to provide clearance for the heads of bolts 6 and for grease cups 43. It will have an appropriate shape in accordance with its use and is connected to the suspended wheel which may be pushed or pulled and which may suitably be guided as desired.

Two sheet steel arms 19 of angular shape are welded on the shaft 8 close to the bearings 9 so as to be spaced apart and perpendicular to the axis of the shaft 8. The two arms 19 have aligned holes 20 located near the elbows of the arms and aligned holes 20a near the ends opposite to those welded to the shaft 8. Two bolts 21 and 21a extend through the aligned holes 20 and 20a respectively and carry two small double ball bearings 22 and 26 (FIG. 2). These ball bearings are similar and have their inner bearing portions tightened between two similar steel spacers facing each other. Nuts 24 and 24a screwed on bolts 21 and 21a tighten the bearings and spacers between the two arms 19 (FIGURES 2 and 4). A gasket holder 23 (FIG. 4) is shown in the form of a concentric circular crown which can be filled with grease and is made of a small tube, one end of which is fitted into a washer and the other is surrounded by another shorter washer holding a circular rubber sealing ring 25 having a flared and tapered side (FIGURE 2) which provides a seal against the lateral sides of the outer bearing members of bearings 22 and 26 as illustrated in cross section in FIG. 4.

Two similar seals 25a are provided on shaft 8, one inside of the bearing 11 and the other on the outside of the gear case. These seals work against the removable side 4 of the gear case (FIGS. 1 and 4). Two additional rubber seals 27 (FIGURE 4) are provided on shaft 8 between arm 19 and the ball bearing 9. They have the same general shape as the seals 23, but without the washer and have tapered angular lip portions engaging the outer bearing members of the bearings 9.

A main lever 28 (FIGURE 3) comprises a substantially straight steel bar of rectangular cross section which is of uniform thickness and is provided at its lower end with a circular opening 31. The lower part of the lever 28 is curved and is widened by a portion 29 which projects laterally from an edge of the lever 28 and is shaped like a beak to provide a cam surface or ramp 30 which extends to the rounded lower end of the lever and is shaped like a stretched S. Two projecting rim portions 32 run along the sides of the ramp 30 and provide guides for the ball bearing 22 which is engaged by the ramp portion 30 of the main lever 28. As described above, the ball bearing 22 is carried by the arms 19 on the shaft 8.

The main lever 28 is pressed against the ball bearing 22 on arms 19 by a main spring 34 (FIG. 2). One end of the spring 34 is connected to the upper end of the main lever 28 by a bridle 33 (FIG. 2) which is provided with a double chamfer portion 35 fitting into a cavity 36 provided near the upper end of the lever 28. The bridle 33 is secured to the spring by a bolt 37. The bolt is provided with a nut 38. The other end of the spring 34 is attached to the casing as will be described below.

The lower end of the main lever 28 is pivotally mounted in the casing. Two cylindrical bronze bushings 40 (FIGURE 2) having a central opening 41 with longitudinally extending grooves 42 are pressed into the opening 31 from opposite sides of the lever 28 to a distance permitted by annular rim portions at the outer ends of the bushings, to leave a central cavity between the inner ends of the bushings 40 as seen in FIG. 2. The bushings 40 rotate on two steel bearing members 44 each comprising a tubular portion provided at an end with an annular washer. The bearing members 44 (FIGURE 2) fit into the bushings 40 and their inner ends abut as seen in FIG. 10. A grease hole 45 is formed in the abutting edges of the lever-holders 44. Annular seals 25 are provided between the washer-like end portions of the bearing members 44 and the ends of the bronze bushings 40 (FIG. 2).

Two triangular sheet-steel plates 46 are welded perpendicularly on the lower portion of the vertical left side of the gear case parallel to one another and at equal distances from lateral sides 3 and 4 (FIG. 2). A steel shaft 47 (FIG. 2) extends through holes in the apex portions of the plates 46 and one end of the shaft 47 extends out through an opening 48 in the removable side 4 and of the gear case. The projecting end of the shaft 47 is threaded from the corresponding plate 46 all the way to the end as indicated at 49 while the opposite end of the shaft is provided with a short threaded portion 50. The lever 28, bushings 40 and bearing members 44 together with seals 25 are all assembled on the shaft 47 and the assembly is tightened between plates 46 by means of two nuts 51 (FIGURE 2).

Lubrication for the bearing of the main lever 28 is provided by a grease cup 43 (FIG. 3) which can be filled with grease and is internally threaded to screw onto the projecting end of shaft 47 (FIG. 2). When the grease cup 43 is screwed onto the outer threaded end of the shaft 47, grease is forced through a canal 52, bored in the center of the shaft 47 and communicating with a radial bore leading to the greasing hole 45 (FIG. 2). The grease thus supplied can penetrate into the space between the bushings 40 and into the grooves 42 of the bushings. A grease seal is provided by the seals 25 described above.

Movement of the main lever 28 is limited by a conical rubber bumper not shown molded onto a threaded iron stud not shown. The bumper is placed on the left side of the gear case between the triangular upper portions of plates 46 and is held in place by means of a nut 24 screwed onto the stud which extends through a hole in the gear case (FIGURES 1 and 2).

Figure 3:
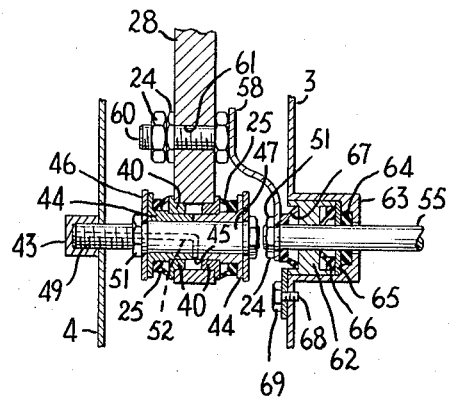
FIGURE 3 is a partial sectional view of the units shown in FIGURES 1 and 2.

The main lever 28 is connected to a corresponding lever of a similar suspension unit for the opposite wheel of the vehicle by a stabilizing torsion bar 55 which is coaxial with the shafts 47 of the two suspension units. (FIGURES 1 and 3.) Its extremities, one of which is shown in FIG. 2, are provided with a male hexagonal portion 56 and a threaded end portion 57. They are connected to the main lever 28 of the respective unit by an arm in the form of a flat and rectangular steel plate 58 which is provided at one end with a hexagonal hole 59 fitting onto the hexagonal portion 56 of bar 55 and held in place by a nut 24 screwed onto the threaded end portion of the bar. The plate 58 is offset laterally (FIG. 2) and is provided at its opposite end with a threaded stud 60 which goes through a hole 61 (FIGURE 2) in the lower portion of lever 28, but above the bearing hole 31. The stud 60 is secured in place by lock nuts 24 (FIG. 3). The plate 58 constitutes an arm connecting torsion rod 55 with the main lever 28 so that the two turn together.

The torsion bar 55 is rotatable in a cylindrical bronze bearing which, as shown in FIG. 2, is provided with inner grooves of I cross section which can be filled with grease. The bearing 62 is positioned inside a cylindrical outwardly projecting bearing socket 63 formed integrally in the lateral side 3 of the gear case (FIGS. 1 and 3). A rubber washer 64 (FIG. 3) is provided on the bar 55 and inside the bearing socket 53 to protect the inside of the gear case against the dirt in the air. A flat steel washer 65 (FIG. 3) compresses the rubber washer 64. A rubber sealing washer 66 (FIG. 3) is placed between the washer 65 and bearing 62. Finally, between the bearing 62 and the connection plate, 58, there is a sealing ring 67 (FIG. 3) which is similar to seal 25 but smaller and which seals on the lateral inside circumference of the bearing. The bearing 62 is retained in place by means of a rectangular sheet steel plate 68 (FIG. 3) secured on the inner face of the lateral side 3 by means of a stud bolt 69 (FIGS. 2 and 3).

A secondary lever 70 (FIG. 2) passes freely between the parallel arms 19 and between the bearings 22 and 26. The lever 70 is of the same thickness as main lever 28, but is shorter and has a bevelled ramp portion 30 which is straight and engages the ball bearing 26 located at the outer ends of the arm 19 (FIG. 2). Projecting rim portions 32 are provided at opposite sides of the ramp as on lever 28. The lever 70 is formed of steel and has a straight central portion with angular end portions which are inclined in the same direction as one another. The lower end of the lever 70 is provided with a circular hole 31 which has its center on the same line as a ramp. The lever 70 is pivotally mounted on the level of shaft 8 between two sheet steel plates 71 which are welded or otherwise secured to the bottom of the case and are spaced apart and parallel to one another and to the lateral sides 3 and 4 of the case. The plates 71 have a higher portion providing a support for the lever 70 and a lower portion providing for the attachment of a spring as will be described below. The secondary lever 70 is pivotally mounted on a shaft 47 extending through aligned holes in the mounting plates 71 and provided with a bearing construction like that of the main lever 28 (FIG. 3).

One end of a release spring 73 is secured to the mounting plates 71 by means of a bolt 75 which extends through aligned holes in plate 71 and through an attaching eye 72 of the spring 73 positioned between the plates 71 by two rubber washers 74 (FIG. 2). The rubber washers 74 are of a sufficiently large diameter to project above the upper edges of the plates 71 and provide a bumper for the ball bearing 26 when the suspension is not working. Arm 14 will then be in an oblique position at about 45° from a horizontal plane passing through axis of the shaft 8. The bolt 75 is provided with a nut 38 which is tightened to squeeze the washers 74 and the attaching eye 72 of spring 73 tightly between the plates 71.

The opposite end of spring 73 is connected by a bolt 37 and nut 38 to a bridle 33 by means of which the spring is attached to the lower extremity of a rock lever 76 pivotally supported at its center between two triangular plates 46 by a bearing structure the same as that of levers 28 and 70. The mounting plates 46 are welded in like manner on the lower part of the vertical right side of the gear case (FIG. 2). A second release spring 73 is connected by two bridles 33 with the upward extremity of rock lever 76 and the upper extremity of secondary lever 70 (FIG. 2). The construction and attachment of the bridles 33 is the same as described above, the levers being provided with recesses 36 to receive the bridles.

The main spring 34 (FIG. 2) and the two release springs 73 (FIG. 2) are made of steel with a cylindrical shape and tight spirals ending with attaching rings 72. In the gear case, they are superposed as shown in FIG. 2 with the main spring in the upper part of the case and the two release springs below it. They have a traction action in a longitudinal direction and are disposed in the casing at equal distances from, and approximately parallel to, the lateral sides 3 and 4.

The rock lever 76 (FIG. 2) is made of steel with the same thickness as lever 28 and 70. It is approximately straight except that a central portion is widened and is provided with an attaching hole 31 to receive a bearing structure like that described with respect to lever 28. Its upper and lower portions are adapted to engage alternatively on a rubber bumper 77 of trapezoidal shape as shown in FIGURE 2. The larger base of the trapezoidal rubber bumper 77 is applied on the right vertical side of the gear case (FIG. 2), between plates 46 and is attached at the same level as the shaft of the rock lever 76 by means of a bolt 21 which is molded into the bumper and extends through a hole in the side of the case to receive an external nut 24.

The right hand end of the main spring 34 is attached by a means of a bolt 37 and nut 38 between two flat parallel wings 78 of a steel mounting fixture 79 (FIG. 2) which slides in a square sheet steel framework 80 welded on the right vertical side of the gear case above the mounting plates 46 of the rock lever 76. A threaded rod 81 extending centrally from the base portion of the fixture 79 goes through a hole in the side of the gear case and is provided with an external nut 51 which can be turned to adjust the tension of the main spring (FIG. 2).

In the operation of the suspension unit which has been shown and described, rotation of the shaft 8 in a counterclockwise direction (FIG. 2), by the suspension arm 14 attached to the vehicle wheel causes the arms 19 welded to the shaft 8 to swing in a counterclockwise direction about the axis of the shaft. The roller bearing 22 carried by the central portions of arms 19 presses against the ramp portion 30 of the main lever 28 and causes the lever 28 to swing in a counterclockwise direction against the adjustable tension of the main spring 34. It will be seen that because of the respective locations of the axis of shaft 8 and the pivotal axis of the lever 28, the roller bearing 22 rolls on the ramp 30 of lever 28 during this counterclockwise movement so as to approach closer to the pivotal axis of the lever 28. At the same time, the roller bearing 26 carried at the ends of the arms 19 through engagement with the ramp portion 30 of the secondary lever 70 causes the lever 70 likewise to swing in a counterclockwise direction about its pivot. The counterclockwise motion of the lever 70 is resiliently resisted by the release springs 73 in the manner that tensioning of the upper release spring 73 tends to rock the rock lever 76 in a counterclockwise direction so as to apply tension also to the lower release spring 73. By reason of the relative locations of the axis of shaft 8 and the pivotal axis of the secondary lever 70 and the location of the roller bearing 26 on arms 19, the bearing 26 rolls on the ramp 30 of the secondary lever 70 in a direction away from the pivotal axis of lever 70 during counterclockwise movement of the arms 19 and the resulting counterclockwise movement of secondary lever 70.

By reason of the construction shown and described, the main spring under the action of the load has a resistance point which moves closer to its fulcrum and this gives a fast and accurate action. The contrary happens with respect to the secondary lever 70 since its resistance point moves away from its fulcrum under the action of the load.

By reason of the connection provided by the rod 55 as described above, rotary movement of the main lever 28 of the suspension unit for one wheel of a vehicle is transmitted through rod 55 to the corresponding main lever 28 of the suspension unit of the opposite wheel of the vehicle. The combined action of the primary and secondary levers of the suspension units and the interconnection of the primary levers through the torsion bar 55 levels out any unevenness of the road and keeps the automobile or other vehicle in a stable position.

While the invention has been described with respect to the preferred embodiment shown by way of example in the drawings, it will be understood that the scope of the invention is in no way limited to the illustrated embodiment.

What I claim is:
1. Suspension means for a vehicle wheel, comprising a casing, a shaft rotatably mounted in said casing, means connecting said shaft to said wheel, an arm on said shaft in said casing, said arm carrying two bearings, a first lever pivotally mounted in said casing and bearing on one of said bearings, first spring means acting on said first lever to urge said first lever against said one bearing, a second lever pivotally mounted in said casing and bearing on the other of said bearings and second spring means acting on said second lever to urge said second lever against said other roller, whereby rotation of said shaft causes movement of said arm to swing said levers about their pivots against the action of said spring means.

2. Suspensions means according to claim 1, in which said one bearing on said arm moves closer toward the pivotal axis of said first lever upon rotation of said shaft under load while said other bearing moves farther away from the pivotal axis of said second lever.

3. Suspension means according to claim 1, in which said first lever has a cam contour engaging said one bearing.

4. Suspension means according to claim 1, in which said first spring means comprises a tension spring having one end attached to said first lever near one end thereof and having the other end of said first spring attached to said casing.

5. Suspension means according to claim 1, in which said second spring means comprises a rocking lever fulcrumed in said case, a first tension spring connected between one end of said rock lever and one end of said second lever and a second tension spring connected between the other end of said rocking lever and said casing.

6. Suspension means according to claim 1, in which said arm comprises spaced arm members and in which said bearings are secured between said arm members.

7. Suspension means according to claim 1, in which said arm is angular with two legs and an elbow therebetween and in which the end of one leg is secured to said shaft and said bearings are mounted at said elbow and the free end of the other of said leg.

8. Suspension means according to claim 1, in which said means connecting said shaft to said wheel includes a suspension arm secured on an end portion of said shaft.

9. A suspension system for two wheels of a vehicle comprising two suspension means in accordance with claim 1 connected respectively with said wheel and means torsionally connecting said first lever of one said suspension means with said first lever of the other of said suspension means.

No references cited.

ARTHUR L. LA POINT, *Primary Examiner.*

R. M. WOHLFARTH, *Assistant Examiner.*